United States Patent
Shin et al.

(10) Patent No.: US 9,785,202 B2
(45) Date of Patent: Oct. 10, 2017

(54) METHOD FOR CONTROLLING ROTATION OF SCREEN AND TERMINAL AND TOUCH SYSTEM SUPPORTING THE SAME

(71) Applicant: Samsung Electronics Co. Ltd., Suwon-si, Gyeonggi-di (KR)

(72) Inventors: Seokin Shin, Suwon-si (KR); Choongkwon Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 231 days.

(21) Appl. No.: 13/671,921

(22) Filed: Nov. 8, 2012

(65) Prior Publication Data
US 2013/0113836 A1  May 9, 2013

(30) Foreign Application Priority Data
Nov. 9, 2011  (KR) .................. 10-2011-0116253

(51) Int. Cl.
*G06F 3/041* (2006.01)
*G09G 5/00* (2006.01)
*G06F 1/16* (2006.01)

(52) U.S. Cl.
CPC .......... *G06F 1/1694* (2013.01); *G06F 1/1626* (2013.01); *G06F 2200/1614* (2013.01); *G06F 2200/1637* (2013.01)

(58) Field of Classification Search
CPC ............. A63F 2300/105; G06F 1/1694; G06F 3/0346; G06F 3/017; G06F 1/1626; G06F 2200/1637; G06F 3/0488; G06F 1/203; G06F 3/0414; G06T 7/004; G06T 7/70; G01J 3/0272

USPC ......................... 345/650, 659, 173
See application file for complete search history.

(56) References Cited

U.S. PATENT DOCUMENTS

| | | |
|---|---|---|
| 6,348,928 B1 | 2/2002 | Jeong |
| 8,558,851 B1 * | 10/2013 | Tseng ............ G09G 5/00 345/619 |
| 2004/0039862 A1 | 2/2004 | Hunt et al. |
| 2004/0157647 A1 | 8/2004 | Takahashi |
| 2007/0085759 A1 | 4/2007 | Lee et al. |

(Continued)

FOREIGN PATENT DOCUMENTS

| | | |
|---|---|---|
| CN | 1828503 A | 9/2006 |
| CN | 101256477 A | 9/2008 |

(Continued)

*Primary Examiner* — Gregory J Tryder
*Assistant Examiner* — Yuehan Wang
(74) *Attorney, Agent, or Firm* — Jefferson IP Law, LLP (57) ABSTRACT

A method for controlling rotation of a screen according to a user request regardless of an orientation state of the terminal is provided. The terminal for supporting screen rotation control, includes a sensor unit including a sensor for confirming a horizontal state of the terminal and a sensor for collecting angular velocity information of the terminal, a controller for confirming the horizontal state of the terminal based on sensing information of the sensor unit, and for confirming a rotated state or a rotation change state of the terminal in a corresponding horizontal state when the terminal is arranged in the horizontal state, and a display unit for outputting a screen having a different output direction according to the rotated state or the rotation change state of the terminal.

16 Claims, 7 Drawing Sheets

(56) References Cited

U.S. PATENT DOCUMENTS

| | | |
|---|---|---|
| 2007/0171240 A1 | 7/2007 | Koh |
| 2007/0252853 A1 | 11/2007 | Park et al. |
| 2008/0291221 A1 | 11/2008 | Yamada et al. |
| 2009/0187677 A1 | 7/2009 | Hunt et al. |
| 2009/0265671 A1* | 10/2009 | Sachs et al. ............. 715/863 |
| 2009/0289958 A1 | 11/2009 | Kim et al. |
| 2010/0066763 A1* | 3/2010 | MacDougall et al. ....... 345/656 |
| 2010/0164886 A1 | 7/2010 | Nakamura |
| 2010/0194683 A1 | 8/2010 | Piper et al. |
| 2010/0214320 A1 | 8/2010 | Mo |
| 2011/0221667 A1 | 9/2011 | Lee |
| 2011/0279350 A1* | 11/2011 | Hutchinson et al. ......... 345/1.1 |
| 2012/0254773 A1* | 10/2012 | Viswanathan ............... 715/753 |
| 2013/0021377 A1* | 1/2013 | Doll ........................... 345/649 |
| 2013/0176669 A1* | 7/2013 | Takahashi et al. ....... 361/679.01 |

FOREIGN PATENT DOCUMENTS

| | | |
|---|---|---|
| CN | 101593037 A | 12/2009 |
| CN | 102203850 A | 9/2011 |
| CN | 103201700 A | 7/2013 |
| GB | 2467370 A | 8/2010 |
| JP | H03-171321 A | 7/1991 |
| JP | 8-129557 A | 5/1996 |
| JP | 2001-136259 A | 5/2001 |
| JP | 2004-163816 A | 6/2004 |
| JP | 2004-240878 A | 8/2004 |
| JP | 2007-109240 A | 4/2007 |
| JP | 2010-128140 A | 6/2010 |
| JP | 2010-181556 A | 8/2010 |
| JP | 2011-064891 A | 3/2011 |
| JP | 2011-175453 A | 9/2011 |
| KR | 10-2007-0039790 A | 4/2007 |
| KR | 10-0782075 B1 | 12/2007 |
| KR | 10-2009-0121971 A | 11/2009 |
| KR | 10-2010-0095212 A | 8/2010 |
| KR | 10-2011-0101585 A | 9/2011 |
| RU | 5656 U1 | 12/1997 |
| RU | 2297040 C2 | 4/2007 |
| WO | 2013/021539 A1 | 3/2015 |

* cited by examiner

METHOD FOR CONTROLLING ROTATION OF SCREEN AND TERMINAL AND TOUCH SYSTEM SUPPORTING THE SAME

PRIORITY

This application claims the benefit under 35 U.S.C. §119(a) of a Korean patent application filed on Nov. 9, 2011 in the Korean Intellectual Property Office and assigned Serial No. 10-2011-0116253, the entire disclosure of which is hereby incorporated by reference.

BACKGROUND OF THE INVENTION

1. Field of the Invention

The present invention relates generally to rotation control of a screen display of a terminal. More particularly, although not exclusively, the present invention relates to a method for controlling the rotation of a screen display of a terminal according to a user request regardless of a position state of the terminal (e.g. regardless of whether or not the terminal is laid flat).

2. Description of the Related Art

Recently, the use of a portable terminal in various fields, such as in the industrial and life sciences fields, has become popular. This is in part due to the size of the terminal which makes it convenient to carry the terminal while supporting various user functions. Meanwhile, a conventional portable terminal supports a certain user function that can be changed according to user setting based on terminal state information to satisfy convenience or needs of a user. For instance, the conventional portable terminal changes a direction output of a screen according to a state or position of a terminal. That is, the direction of the screen of the terminal can be changed to a landscape mode direction or a transverse or picture mode direction, according to an orientation and elevation of the terminal with respect to a flat surface.

However, such a screen control function of the conventional terminal is supported only under certain conditions. That is, the conventional terminal has a disadvantage that a screen rotation control function cannot be supported if the terminal is laid flat on the ground. In other words, the conventional terminal needs to be slanted at a greater than a predetermined angle to control the orientation of a screen. Accordingly, although the terminal is rotated, to control the orientation of the screen a user needs to also elevate the screen. Such additional operation may cause a significant inconvenience to the user in a situation in which a terminal is put on a desk and a writing work is performed or a drawing work is performed. When the terminal is put on a desk or laid flat on the desk and screen rotation is required while information reading or writing is performed, the user needs to grasp and rotate the terminal such that the terminal is slanted at an angle greater than a predetermined angle.

SUMMARY OF THE INVENTION

It is an aim of certain embodiments of the present invention to address, solve, mitigate or obviate, at least partly, at least one of the problems and/or disadvantages associated with the related art, such as the above-mentioned problems and/or disadvantages. Certain embodiments of the present invention aim to provide at least one of the advantages described below.

Accordingly, certain embodiments of the present invention provide a method for controlling rotation of a screen display, a terminal, and a touch system supporting the same. The rotation may be controlled according to a user's intention and regardless of a state of the terminal (e.g. regardless of whether or not the terminal is laid flat).

In accordance with an aspect of the present invention, a method for controlling a rotation of a screen of a terminal is provided. The method includes: determining whether the terminal is arranged in a horizontal state; checking a rotated state or a rotation change state of the terminal in the horizontal state or when the terminal is arranged in the horizontal state; and changing a screen output orientation of a display unit of the terminal according to the rotated state or the rotation change state of the terminal in the horizontal state.

In accordance with another aspect of the present invention, a terminal for supporting screen rotation control is provided. The terminal includes: a sensor unit including a sensor for confirming a horizontal state of the terminal and a sensor for collecting angular velocity information of the terminal; a controller for confirming the horizontal state of the terminal based on sensing information of the sensor unit, and for confirming a rotated state or a rotation change state of the terminal in the horizontal state when the terminal is arranged in the horizontal state; and a display unit for outputting a screen having a different output direction (e.g. different display orientations) according to the rotated state or the rotation change state of the terminal.

In accordance with another aspect of the present invention, a touch system supporting screen rotation control is provided. The system includes: a touch pen; and a terminal including an acceleration sensor for confirming a horizontal state of the terminal and a gyro sensor for collecting angular velocity information of the terminal. The terminal is adapted to apply different writing setting values according to a rotated state or a rotation change state of the terminal in a corresponding horizontal state when the terminal is arranged in the horizontal state.

In accordance with another aspect of the present invention, a method for controlling a rotation of a screen of a terminal is provided. The method includes: determining a rotated state or a rotation change state of the terminal; and changing a screen output orientation according to the rotated state or the rotation change state. In an embodiment, the terminal is in a horizontal state. In another embodiment, the screen output orientation is changed according to whether the terminal is in a horizontal state. In another embodiment, the screen output orientation is changed according to a function currently activated in the terminal.

Another aspect of the present invention provides a computer program comprising instructions arranged, when executed, to implement a method, apparatus, terminal and/or system, in accordance with any one of the above-described aspects. A further aspect provides machine-readable storage storing such a program.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description of exemplary embodiments of the present invention, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the embodiments described herein can be made without departing from the scope of the invention.

The same or similar components may be designated by the same or similar reference numerals although they are illustrated in different drawings. In addition, detailed descriptions of functions, processes, structures and constructions known in the art may be omitted for clarity and conciseness, and to avoid obscuring the subject matter of the present invention.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, it is to be understood that the singular forms "a," "an," and "the" include plural referents unless the context clearly dictates otherwise, and where the indefinite article is used, the specification is to be understood as contemplating plurality as well as singularity, unless the context requires otherwise. Thus, for example, reference to "a component surface" includes reference to one or more of such surfaces.

Features, integers, characteristics, compounds, chemical moieties or groups described in conjunction with a particular aspect, embodiment or example of the invention are to be understood to be applicable to any other aspect, embodiment or example described herein unless incompatible therewith.

It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

Figure 1:
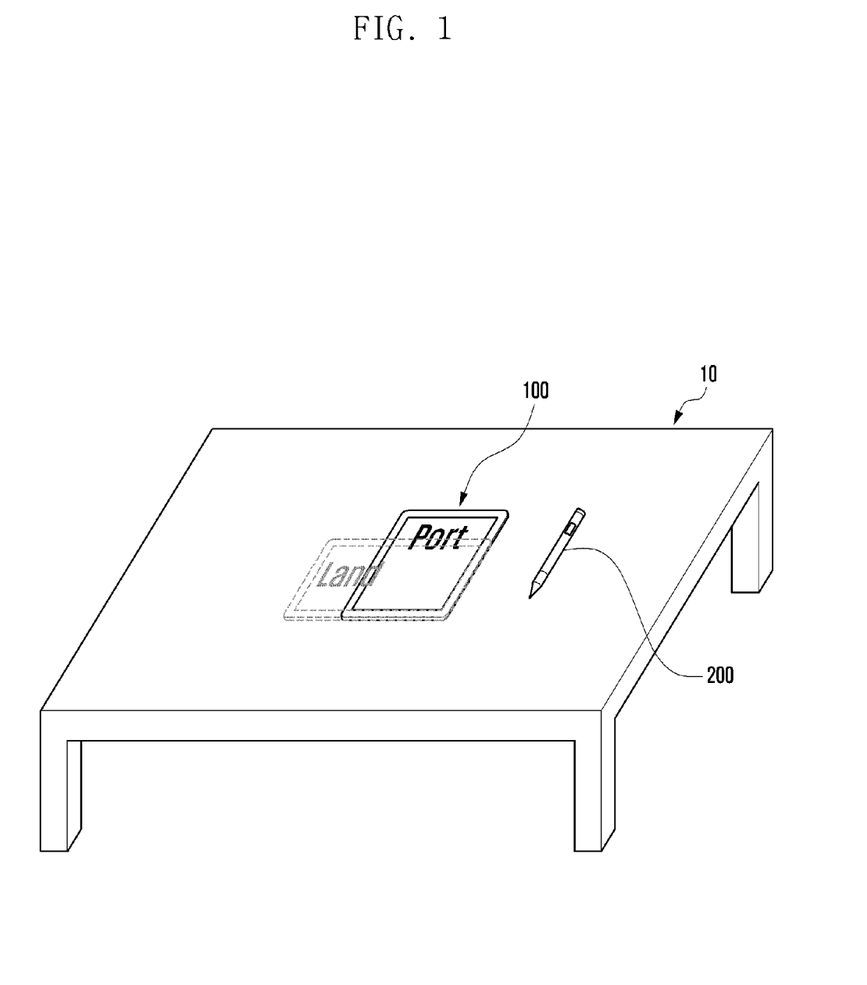
FIG. 1 is a diagram schematically illustrating a touch system of a terminal and a peripheral environment thereof according to an exemplary embodiment of the present invention.

FIG. 1 is a diagram schematically illustrating a touch system of a terminal in which a screen rotation control function is provided and an environment in which the terminal is used according to an exemplary embodiment of the present invention.

Referring to FIG. 1, a touch system of a terminal and the environment in which the terminal is used may include a terminal 100 supporting a screen rotation control function, a certain environment, for example, a desk 100 in which the terminal 100 is arranged, and a touch pen 200 for operating the terminal 100. Here, a characteristic of an exemplary embodiment provides a screen of the terminal 100 which can be rotated in a direction which the user requires, and the desk 10 is provided to describe a situation in which the terminal is placed in a certain state, position or orientation, for example, a horizontal state, a flat position, or an orientation in which the body of the terminal 100 or a display screen of the terminal 100 is parallel with a horizontal surface (e.g. the top surface of the desk 10). Further, the touch pen 200 is added to input an operation in a certain state according to a specific setting.

In the environment illustrated above, the desk 10 provides a surface such that the terminal 100 lies flat or nearly flat on the surface of the desk 10. Accordingly, when the terminal 100 is put on the desk 10, it may lie flat or nearly flat on the desk.

A state in which the terminal 100 is in a horizontal or nearly horizontal position may be referred to as a horizontal mode state. An orientation of the terminal 100 may be changed to a non-horizontal mode state, for example by tilting the terminal with respect to a horizontal plane. Whether in a horizontal mode state or not, an orientation of the terminal 100 may also be changed by rotating the terminal 100 about an axis that is normal to the plane of the terminal screen. For example, the orientation of the terminal 100 may be changed between a landscape orientation and a portrait orientation, differing by 90 degrees, which may be referred to, respectively, as a landscape mode state and a portrait (or transverse or picture) mode state of the terminal 100. Information displayed on a display unit 140 of the terminal 100 may be displayed or orientated in a landscape format or a portrait format, which may be referred to, respectively, as a landscape mode and a portrait (or transverse or picture) mode of the display. The terminal 100 may apply setting values differently according to contact of the touch pen 200 under control of screen conversion in a horizontal mode state. For example, the terminal 100 may apply a writing setting value using the touch pen 200 when the terminal 100 is in horizontal and transverse mode (picture mode) states differently from a writing setting value using the touch pen 200 when the terminal is in horizontal and landscape mode states. Accordingly, the terminal 100 supports screen orientations such that user functions of various forms may be applied according to the use of the touch pen 200. A description associated with an operation of the touch pen 200 will be given with reference to FIG. 7. Further, a configuration of the terminal 100 and screen control in a horizontal state will be described with reference to FIGS. 2 to 5.

Figure 2:
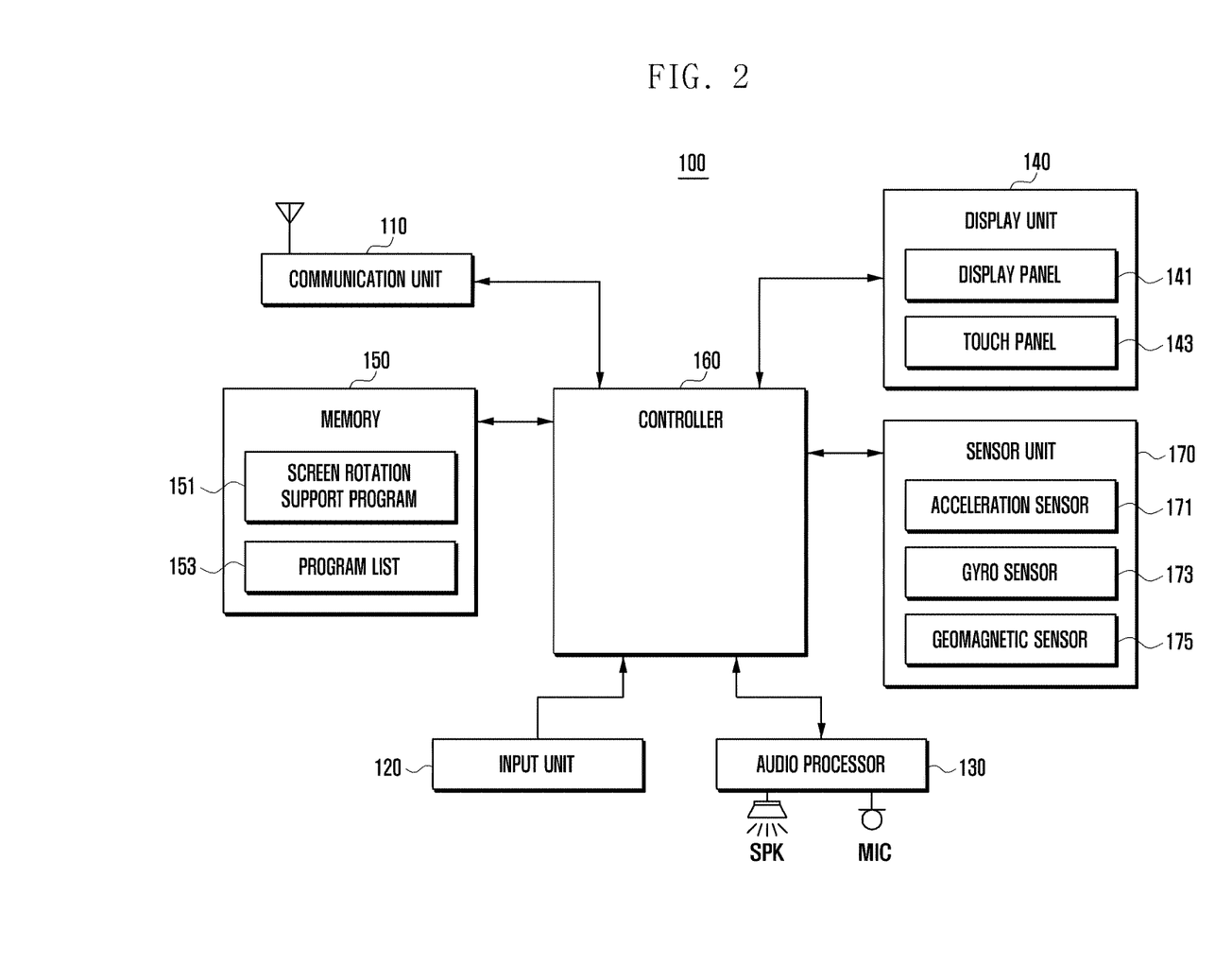
FIG. 2 is a block diagram schematically illustrating a configuration of a terminal according to an exemplary embodiment of the present invention.

FIG. 2 is a block diagram schematically illustrating a configuration of a terminal 100 according to an exemplary embodiment of the present invention.

Referring to FIG. 2, a terminal 100 may include a communication unit 110, an input unit 120, an audio processor 130, a display unit 140, a memory 150, a sensor unit 170, and a controller 160.

When the state of the terminal 100 is maintained in a horizontal mode (e.g. when the terminal 100 is laid flat), the terminal 100 may determine a rotation state of the terminal 100 (e.g. a state in which the terminal 100 has been, or is being, rotated) based on a first sensor, such as a gyro sensor 173, included in the sensor unit 170. The rotation may be, for example, rotation of the terminal 100 about an axis that is normal to the plane of the terminal screen. When the state of the terminal 100 is changed to a mode other than the horizontal mode (e.g. when the terminal is no longer laid flat), the terminal 100 may determine a rotation state of the terminal 100 based on a second sensor, such as an acceleration sensor 171, of the sensor unit 170. Again, the rotation may be, for example, rotation of the terminal 100 about an axis that is normal to the plane of the terminal screen. As described above, the terminal 100 may confirm a rotation state of the terminal 100 using at least one of the first sensor (e.g. acceleration sensor 171) and a second sensor (e.g. gyro sensor 173) included in the sensor unit 170, and change a direction or orientation of a screen (e.g. graphical display and/or graphical user interface) outputted on a display unit 140, for example to a landscape mode or a transverse mode (picture mode) according to the confirmation result.

Here, the communication unit 110 is a configuration to be added when the terminal 100 is manufactured to support a communication function. Accordingly, when the terminal 100 does not support the communication function, the communication unit 110 may be omitted from a configuration of the terminal 100. Meanwhile, the communication unit 110 may be provided in the form of a mobile communication module in order to support a communication function, particularly, a mobile communication function of the terminal 100. The communication unit 110 forms a communication channel with a mobile communication system to support signal transceiving for performing the mobile communication function of the terminal 100. For example, the communication unit 110 may form at least one of a voice service channel, an image service channel, and a data service channel, and support transceiving of a certain signal according to a corresponding service channel.

In particular, when the communication unit 110 is activated to support a call function or a web access function, the communication unit 110 may receive screen support for operating a corresponding function from the controller 160. In this case, a supported operation screen or the orientation of the screen of the communication unit 110 may be changed to a horizontal mode or a vertical mode by applying a screen rotation control function, and a screen rotation control function may be applied in a horizontal mode state under control of the controller 160. Accordingly, when horizontally arranging the terminal 100 and operating the communication unit 110 to search a web page, the user may use screen rotation for a landscape mode or a transverse mode (picture mode) as needed.

The input unit 120 is a configuration for generating various input signals necessary for operating the terminal 100. The input unit 120 may be in the form of a keyboard, a keypad, or a key button according to compatibility of the terminal 100. Further, when the display unit 140 is configured as a touch screen, the input unit 120 may be configured in the form of a touch map outputted on the touch screen. The input unit 120 may generate an input signal for activating a user function supporting a screen rotation control function (e.g. a function in which the screen rotation control function is applied). The input unit 120 may also generate an input signal for performing a setting process such that the screen rotation control function is applied to a certain user function, or to a default function, according to the user control. Here, the input signal for setting the screen rotation control function may be classified into (i) an input signal for setting a screen rotation control function to be applied (e.g. only) in a horizontal mode; (ii) an input signal for setting a screen rotation control function to be applied (e.g. only) in modes except for the horizontal mode; and (iii) an input signal for setting screen rotation control function to be applied regardless of a state of the terminal 100. The foregoing input signals are transferred to the controller 160 and are converted into a command for performing a function according to each input signal or for setting a mode to be applied.

The audio processor 130 may output various audio data set in an operation procedure, audio data according to playback of audio files stored in the memory 150, and audio data received from the outside. Further, the audio processor 130 may support an audio data collecting function. To do this, the audio processor 130 may include a speaker SPK and a microphone MIC. The audio processor 130 may support output of various guide sounds and effect sounds associated with the screen rotation control function. When a screen is rotated from a landscape mode to a transverse mode or from the transverse mode to the landscape mode, the audio processor 130 may output a guide sound or an effect sound informing the occurrence of the rotation. The output function of the guide sound and the effect sound may be omitted according to user setting or intention of a designer.

The display unit 140 is a constituent element for providing various screen interfaces necessary for operating the terminal 100. For example, the display unit 140 supports an idle screen or a menu screen necessary for operating the terminal 100. In particular, the display unit 140 may output a function operation screen according to activation of a certain user function. When the terminal 100 is rotated and the terminal 100 is in a state in which a certain function operation screen is output, the display unit 140 rotates and outputs a direction of the function screen according to the rotation. Such a rotation control function may be selectively operated according to whether the screen rotation control function is set for a specific function and/or whether the terminal 100 is in a certain state. For example, the rotation may be selectively operated according to whether the terminal 100 is in a horizontal state or whether the terminal 100 is tilted so as to have a predetermined slope. For example, according to a user setting and a type of function activated, the screen rotation control function may be set to operate only when the terminal 100 is rotated in a horizontal mode state, or may be set so as to not operate when the terminal is in the horizontal mode state, or may be set so as to operate regardless of a slope or tilt of the terminal 100.

The display unit 140 may be provided in the form of a touch screen in which a display panel 141 and a touch panel 143 overlap each other. Images and texts corresponding to the forgoing various screens may be outputted on the display panel 141. The touch panel 143 may set a valid touch region and an invalid touch region according to a screen characteristic outputted on the display panel 141 and transfer a touch event generated in the valid touch region to the controller 160.

The memory 150 may store various operating systems, application programs, and algorithms necessary for operating the terminal 100. Particularly, the memory 150 may store a screen rotation support program 151 for operating a screen rotation control function, and a program list 153 necessary for operating the screen rotation support program 151.

The screen rotation support program 151 may be a program for supporting a screen rotation control function. When a certain user function is activated, the screen rotation support program 151 may include a routine of checking whether a corresponding user function is registered in a program list. The program list includes a list, for example set by a user, specifying which programs the screen rotation control function is to be applied to. Further, when a user function whose activation is requested is registered in the program list 153, the screen rotation support program 151 may include a function setting checking routine and a screen rotation control routine. The function setting checking routine is for checking whether the screen rotation control function is set. The screen rotation control routine is for activating the sensor unit 170 when the screen rotation control function is set, and for controlling rotation of a screen based on collected sensing information.

Here, the function setting checking routine may include sub routines for checking whether (i) the screen rotation control function is set so as to be supported in a horizontal mode, (ii) the screen rotation control function is set so as to be suppressed in the horizontal mode, and (iii) the screen rotation control function is set so as to be supported regardless of a slope or tilt of the terminal 100.

Accordingly, the screen rotation control routine may include sub routines for determining support of the rotation of the screen based on respective setting values and collected sensing information, and controlling the rotation of the screen according to the determination.

The sensor unit 170 is a constituent element for collecting sensing information according to state change. In particular, the sensor unit 170 may include, for example, an acceleration sensor 171, a gyro sensor 173, and a geomagnetic sensor 175.

Here, the acceleration sensor 171 of the sensor unit 170 senses a gravitational acceleration according to the rotation of the terminal 100. When the terminal 100 is put in a horizontal state, the acceleration sensor 171 generates only a gravitational acceleration in a central direction with respect to the ground. That is, when the terminal 100 is in a horizontal state having no slope with respect to the ground, the acceleration sensor 171 may generate a gravitational acceleration in a direction of 90° based on the horizontal state. The acceleration sensor 171 may be used to detect the horizontal state of the terminal 100.

When the terminal 100 is in a horizontal state or laid flat on a surface and when a screen rotation control function of the terminal 100 is set so as to be supported in a horizontal mode, the gyro sensor 173 is activated to detect an angular velocity. The angular velocity information collected by the gyro sensor 173 may be transferred to the controller 160 in real time. The angular velocity information transferred to the controller 160 from the gyro sensor 173 may be classified into positive direction information and negative direction information of a z axis based on x, y, and z axes, for example, right rotation direction information and left rotation direction information. When the terminal 100 is not in the horizontal state (for example, not laid flat), sensing information collected by the gyro sensor 173 may include angular velocity information generated from at least two of x, y, and z axes. The geomagnetic sensor 175 may be selectively activated under control of the controller 160 and transfer information of east, west, south, north directions according to a compass function.

The controller 160 is a constituent element for controlling signal flow, collection and analysis of sensing information. The controller 160 may support a function for checking a horizontal state of the terminal 100, a function for checking screen rotation control setting of the terminal 100 in the horizontal state, and a function for analyzing activation and collected sensing information of the sensor unit 170 to determine screen rotation control. To do this, the controller 160 may include constituent elements as described above.

Figure 3:
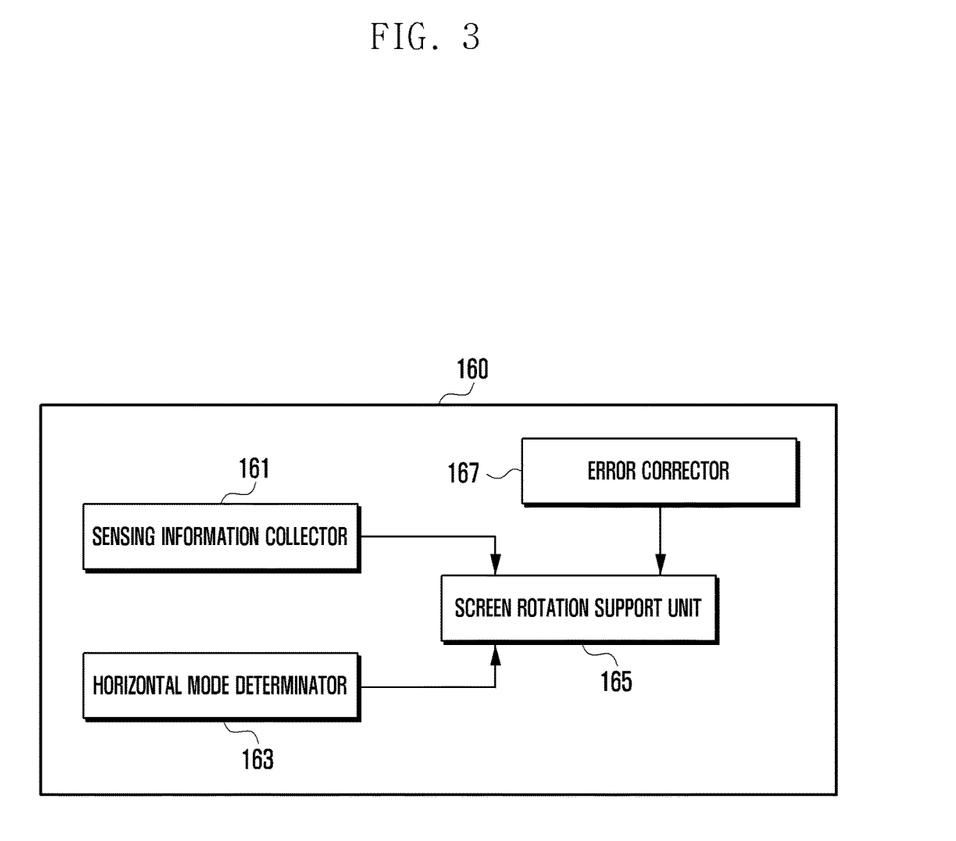
FIG. 3 is a diagram illustrating a detailed configuration of a controller, for example the controller as shown in FIG. 2, according to an exemplary embodiment of the present invention.
Figure 4:
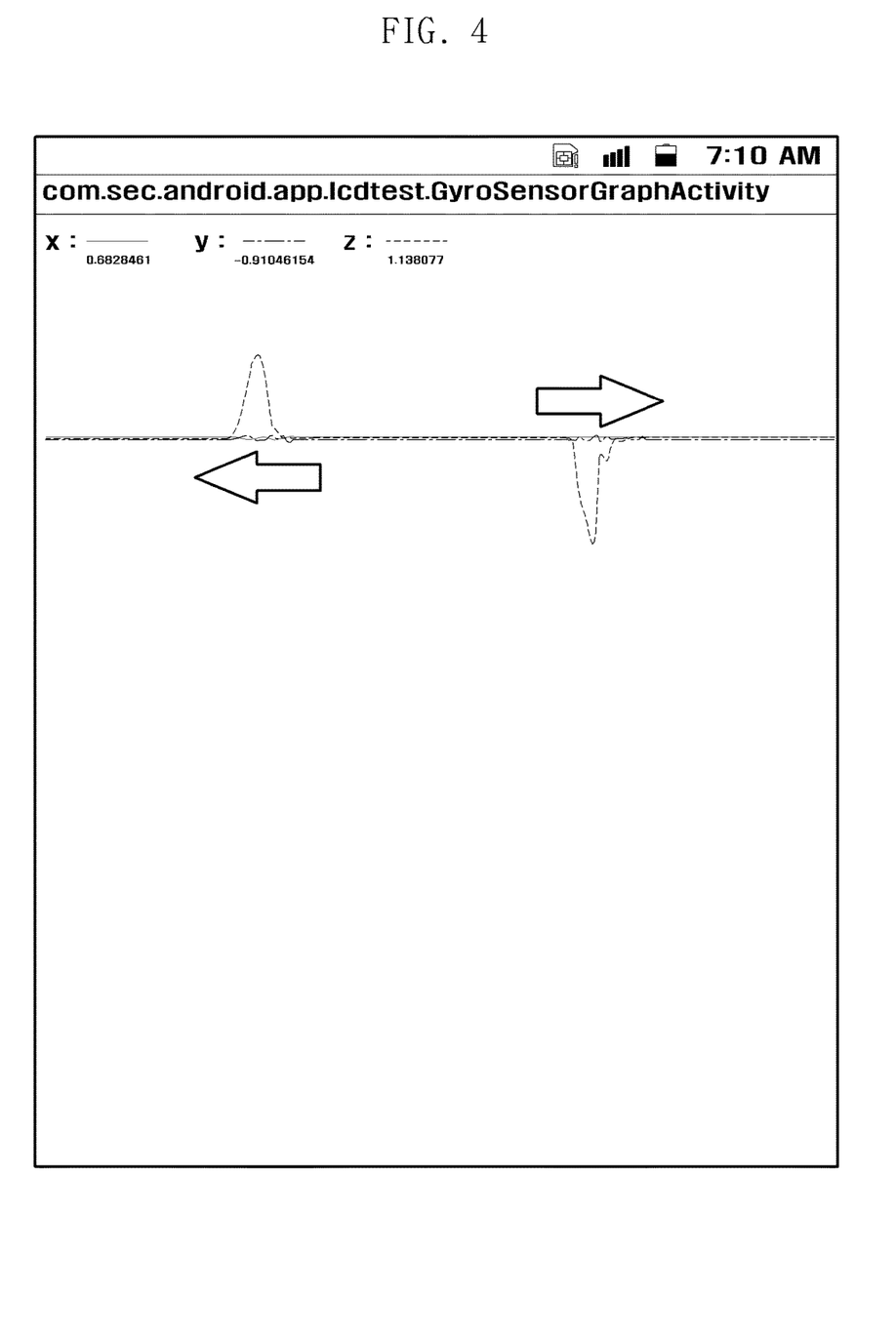
FIG. 4 is a diagram illustrating an angular velocity information analysis for determining a landscape according to an exemplary embodiment of the present invention.
Figure 5:
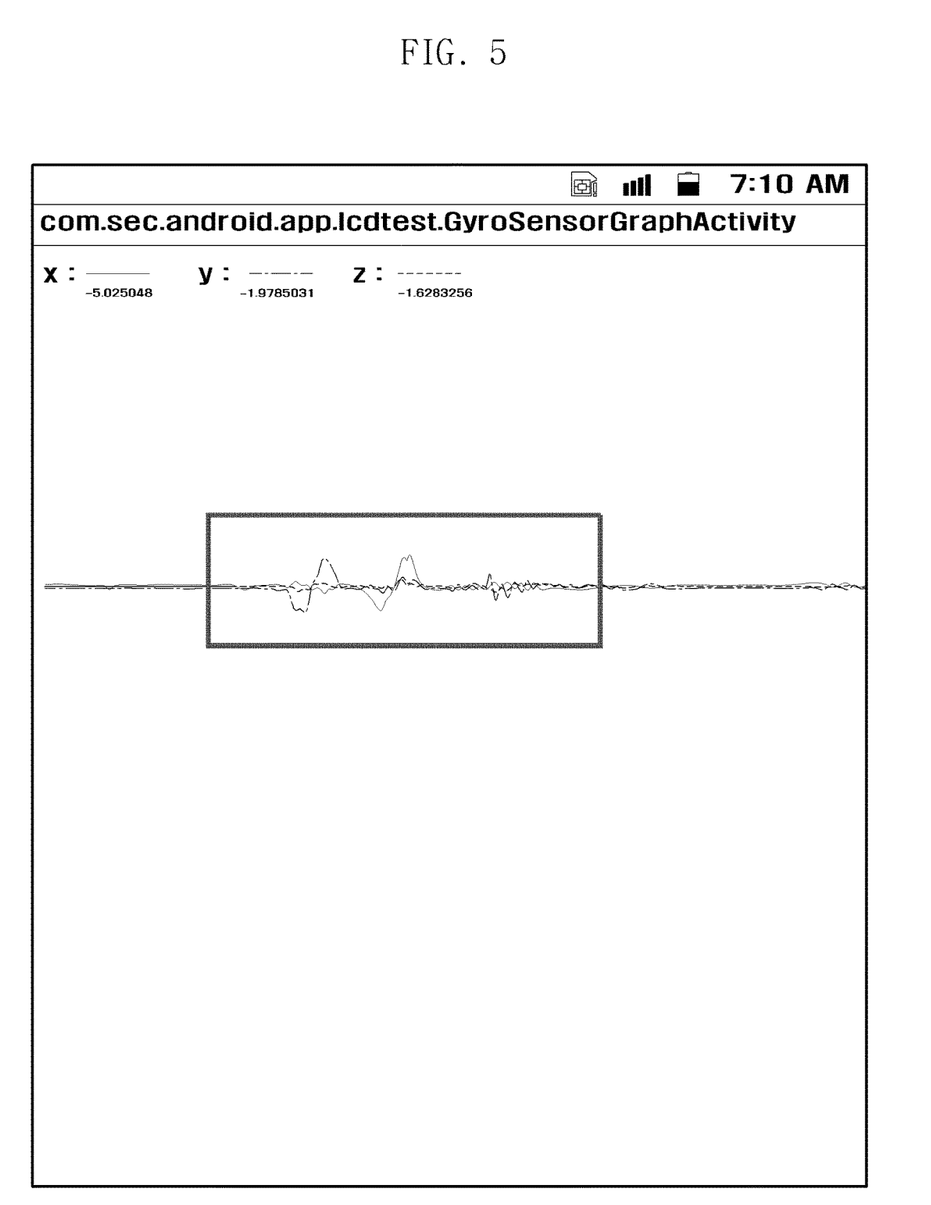
FIG. 5 is a diagram illustrating an angular velocity information analysis for determining an error correction according to an exemplary embodiment of the present invention.

FIG. 3 is a diagram illustrating a detailed configuration of a controller, for example, the controller as shown in FIG. 2, according to an exemplary embodiment of the present invention. FIG. 4 is a diagram illustrating an angular velocity information analysis for determining a landscape mode according to an exemplary embodiment of the present invention. FIG. 5 is a diagram illustrating an angular velocity information analysis for determining an error correction according to an exemplary embodiment of the present invention.

Referring to FIGS. 3 to 5, the controller 160 may include a sensing information collector 161, a horizontal mode determinator 163, a screen rotation support unit 165, and an error corrector 167.

The sensing information collector 161 collects sensing information generated from the sensor unit 170. In particular, when a certain user function is activated, the sensing information collector 161 may determine whether a corresponding user function is registered in a program list 153 indicating that the function is one to which a screen rotation control function is applied. When the corresponding user function is registered in the program list 153, the sensing information collector 161 may control the sensor unit 170 to be activated. In this case, the sensing information collector 161 may control the acceleration sensor 171 to be activated first. When the horizontal mode determinator 163 determines that a state of the terminal 100 is a horizontal state, the sensing information collector 161 may control the gyro sensor 173 to be activated. In this case, the sensing information collector 161 may control the acceleration sensor 171 to become inactivated. Further, the sensing information collector 161 may control the gyro sensor 173 and the geomagnetic sensor 175 to be selectively activated. The sensing information collected by the sensing information collector 161 may be transferred to the horizontal mode determinator 163, the screen rotation support unit 165, and the error corrector 167.

The horizontal mode determinator 163 receives the sensing information from the sensing information collector 161. Further, the horizontal mode determinator 163 determines whether the terminal 100 is in the horizontal state based on the received sensing information. In more detail, the horizontal mode determinator 163 receives sensing information of the acceleration sensor 171 from the sensing information collector 161. Then, the horizontal mode determinator 163 checks whether the sensing information of the acceleration sensor 171 has a specific value, for example whether a gravitational acceleration is 90°. Here, when the gravitational acceleration is 90°, the horizontal mode determinator 163 may transfer the gravitational acceleration to the sensing information collector 161 and the screen rotation support unit 165.

The screen rotation support unit 165 is a constituent element for controlling rotation of the screen of the terminal 100 based on the sensing information from the sensing information collector 161 and the horizontal mode determinator 163. In particular, the screen rotation support unit 165 may detect a horizontal mode state according to analysis based on the acceleration information from the acceleration sensor 171 from the horizontal mode determinator 163 to determine a rotation state of the terminal 100. That is, the screen rotation support unit 165 determines a landscape mode state or a picture or transverse mode state of a terminal 100 using information provided from the horizontal mode determinator 163 based on the acceleration information, and accordingly control the rotation of a screen.

When receiving information from the horizontal mode determinator 163, indicating that a current state of the terminal 100 is a horizontal state, the screen rotation support unit 165 may determine a rotation state of the terminal 100 in a horizontal state based on angular velocity information provided from the gyro sensor 173. In more detail, when the angular velocity information is collected from the sensing information collector 161, the screen rotation support unit 165 accumulates and stores corresponding angular velocity information. Further, when the accumulated angular velocity information is within a certain value, such as 90°, in one direction, the screen rotation support unit 165 determines control of the terminal 100 for screen rotation and controls to change a mode of the screen to another mode. That is, when the terminal display is initially in a landscape mode, and when the angular velocity information in one direction corresponds to a value of 90°, the screen rotation support unit 165 controls the current screen of the terminal 100 to be changed to a transverse or picture mode. On the other hand, when the terminal display is initially in a transverse mode, and when angular velocity information accumulated in one direction corresponds to a value of 90°, the screen rotation support unit 165 controls the orientation of the screen such that the current state or orientation of the screen is changed to the landscape mode. A reference for determining the current state or orientation of the screen, which may be the landscape mode or the transverse mode, may be angular velocity information collected directly before entering the horizontal mode. That is, when a mode directly before entering the horizontal mode is a certain mode, such as a landscape mode or a transverse mode, the screen rotation support unit 165 may determine that the current mode or state corresponds to a previous mode or state.

When a screen mode of the terminal 100 is changed, the screen rotation support unit 165 may control the sensing information controller 161 such that angular velocity information provided from the sensing information collector 161 is initialized. That is, when the screen is rotated from a landscape mode to a transverse or picture mode, the screen rotation support unit 165 may control the sensing information controller 161 such that the angular velocity information is initialized. Further, the screen rotation support unit 165 may again accumulate the angular information provided from the sensing information collector 161 to determine the rotation of the screen. Here, the screen rotation support unit 165 may confirm a direction of accumulated angular velocity information to control the screen rotation.

Referring to FIG. 4, rotation of the terminal 100, when the terminal 100 is in the horizontal state, is described. When the terminal 100 is in the horizontal state or a flat position, and the user rotates the terminal 100 in a predetermined direction (for example, in a left direction or counter clockwise direction) angular velocity information is provided. In particular, the angular velocity is shown as a signal having a spike in a positive direction with respect to a reference line as illustrated in a left side of the graph of FIG. 4. That is, the sensing information collector 161 may collect angular velocity information in a +z axis direction (where the z axis is an axis normal to the terminal screen, for example). Then, the screen rotation support unit 165 determines that the user rotates the terminal 100 in a counter-clockwise direction. When an accumulated value of corresponding angular velocity information indicates a rotation angle equal to or approximately equal to 90°, the screen rotation support unit 165 may control the display unit 140 such that an output mode of the screen is rotated. When the mode is changed from a landscape mode or transverse mode to a transverse mode or a landscape mode, the screen rotation support unit 165 may control the display unit 140 such that the screen is changed based on the left direction.

Further, when the terminal 100 is in the horizontal state, and when the terminal 100 is rotated in a right direction or clockwise direction, angular velocity information is provided in form of a signal having a spike in a negative direction with respect to the reference line as illustrated on the right side of the graph of FIG. 4. That is, the sensing information collector 161 may collect angular velocity information in a −z axis direction. Accordingly, the screen rotation support unit 165 determines that the user rotates the terminal 100 in a clockwise direction, and may determine whether an accumulated value of corresponding angular velocity information indicates a rotation angle equal to or approximately equal to 90°. In this case, the screen rotation support unit 165 may control the display unit 140 such that an output mode of the screen is rotated based on the rotation in the clockwise direction.

Here, when the accumulated angular velocity information indicates a rotation angle less than 90°, for example equal to or approximately equal to 80°, the screen rotation support unit 165 determines this information as indicating a state change of the terminal 100 and controls the display unit 140 such that the screen is rotated in a direction corresponding to the angular velocity information. When the angular velocity accumulated information indicates a rotation angle greater than 90°, the screen rotation support unit 165 can also determine this information as indicating a state change of the terminal 100 for rotating the screen as a current state, and control the display unit 140 such that the screen is rotated in a direction corresponding to the angular velocity information. In certain embodiments of the invention, a threshold corresponding to a predetermined angle for changing a state for screen rotation may be set, and the threshold value may be controlled according to user setting or intention of a designer. To provide a state change threshold, the terminal 100 may provide a threshold setting menu for determining rotation of the terminal 100 when the terminal 100 is in a horizontal state. Then, the user may set a state change threshold using a corresponding menu.

In the meantime, the screen rotation support unit 165 may support a rotation mode of a screen in one direction according to an accumulation information direction of angular velocity. That is, when the accumulation angular information direction is a +z axis direction being a left or counter-clockwise direction, the screen rotation support unit 165 may control the display unit 140 such that a screen state is maintained in a landscape mode. That is, when the terminal 100 is rotated in a left or counterclockwise direction greater than a predetermined angle in a horizontal state with respect to a flat surface regardless of a current screen state of the terminal 100, the screen rotation support unit 165 may control the display unit 140 such that a screen state is changed to a landscape mode or the landscape mode is maintained. In the same manner, when the accumulated information direction of angular velocity is a −z axis direction being a right or clockwise direction, the screen rotation support unit 165 may control the display unit 140 such that the screen state is maintained in a transverse mode. That is, if the terminal 100 is rotated in a clockwise or right direction greater than a predetermined angle in a horizontal state, regardless of a current screen state of the terminal 100, when the screen state is changed from a previous certain mode to a transverse or picture mode or in a transverse mode, the screen rotation support unit 165 may control the display unit 140 such that a corresponding mode is maintained. When the rotation occurs at a predetermined angle in a left or counterclockwise direction, the screen rotation support unit 165 controls the display unit 140 such that the screen state becomes the landscape mode. When the rotation occurs at a predetermined angle in a right direction, the screen rotation support unit 165 controls the display unit 140 such that the screen state becomes the transverse mode. Here, the screen rotation support unit 165 may reset to again accumulate sensing information of a gyro sensor 173 after change of a screen mode, and support screen change based on accumulated sensing information.

An error corrector 167 is a constituent element for determining a case where the user does not arrange the terminal 100 in a fixed or stable surface such as a table or a desk but arranges the terminal on a non-flat or unstable surface, or carries the terminal 100. To do this, when receiving sensing information from the sensing information corrector 161, particularly, when collecting angular velocity information, the error corrector 167 may confirm an error of corresponding angular velocity information. In a procedure of confirming the error, when sensing information, as illustrated in FIG. 5, is collected, the error corrector 167 may control the display unit 140 such that a horizontal mode of the terminal 100 is released. That is, when the user horizontally maintains the terminal 100 in a state in which the user grasps the terminal, the horizontal mode determinator 163 may determine that a current state of the terminal 100 is horizontal. When receiving angular velocity information from the sensing information collector 161 and angular velocity information in at least one of x, y, and z axes, particularly, when the x and y axes information are collected in a greater value than a preset value, the error corrector 167 may control the terminal 100 such that a determined horizontal mode is released or prevented from entering the horizontal mode.

In addition, the screen rotation support unit 165 may confirm sensing information of a geomagnetic sensor 175 to confirm direction change information of a compass. That is, the screen rotation support unit 165 may confirm sensing information of the geomagnetic sensor 175 in a procedure of determining screen rotation based on angular velocity information of the gyro sensor 173 to confirm in which direction the terminal 100 rotates. Further, the screen rotation support unit 165 may confirm direction information of the gyro sensor 175 to determine a rotating state of the terminal 100 and accordingly control change of the screen.

Figure 6:
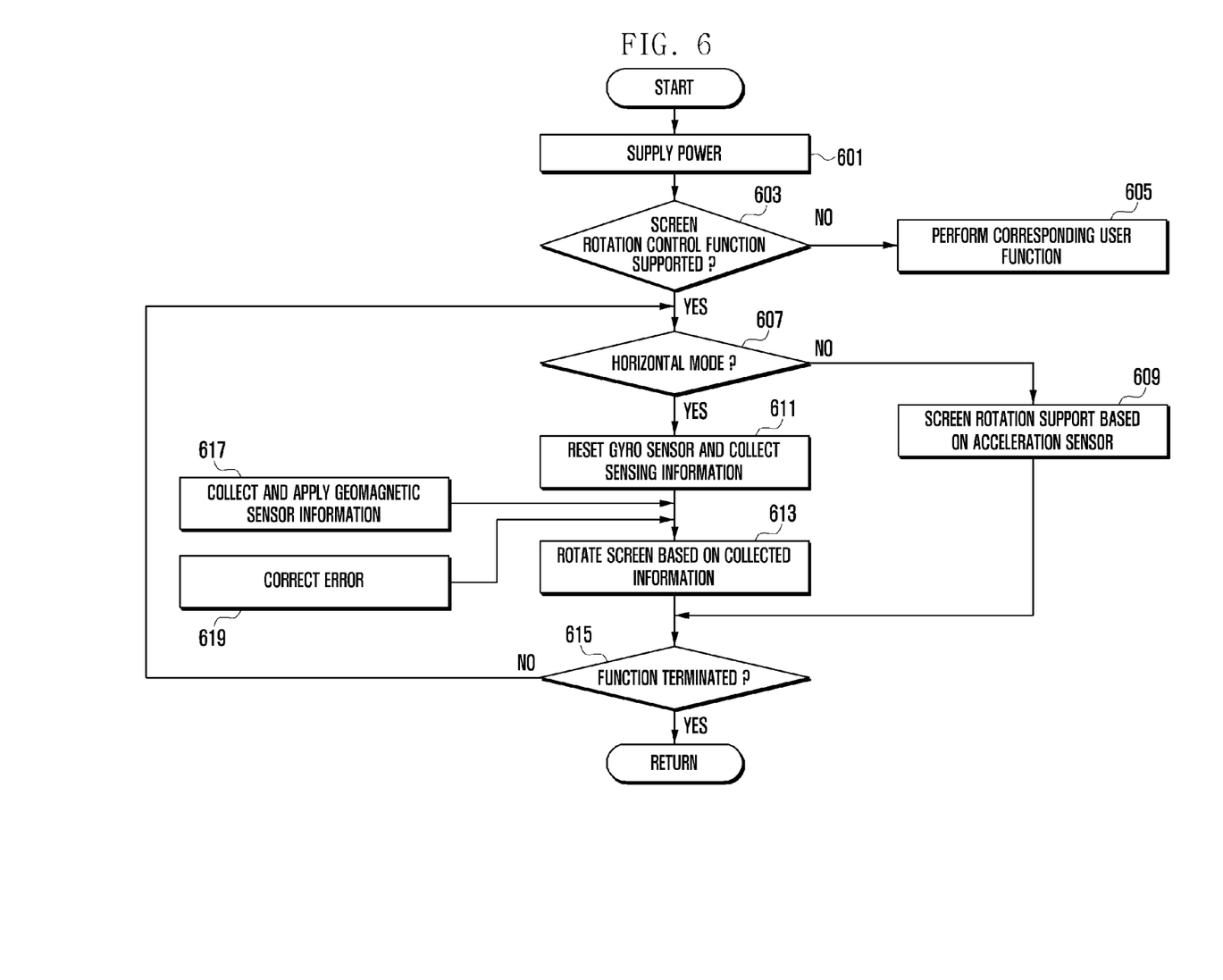
FIG. 6 is a flowchart illustrating a method for controlling rotation of a screen according to an exemplary embodiment of the present invention.

FIG. 6 is a flowchart illustrating a method for controlling rotation of a screen according to an exemplary embodiment of the present invention.

Referring to FIG. 6, in the method for controlling rotation of a screen according to an exemplary embodiment, a controller 160 may distribute power for operating respective constituent elements of a terminal 100 in step 601. Next, the controller 160 may determine whether an input signal for supporting a screen rotation control function is generated in step 603. That is, when an input for activating a certain user function is generated, the controller 160 may determine whether a user function requested according to a corresponding input signal is a user function for which a screen rotation control function is requested. To do this, the controller 160 may confirm a program list 153 stored in the memory 150 to determine whether a user function whose activation is requested is a user function registered to apply a screen rotation control function.

When the input signal for supporting a screen rotation control function is not generated at step 603, the controller 160 may control the terminal 100 such that a corresponding user function according to the input signal is performed in step 605. For example, the controller 160 may perform a user function such as playing files, a voice or image call connection function, and a broadcasting viewing function according to a corresponding input signal. When the input signal for supporting a screen rotation control function is generated at step 603, the controller 160 may determine whether a current terminal 100 is in a horizontal mode state in step 607. To do this, when the input signal for supporting a screen rotation control function is generated, the controller 160 may control the terminal 100 such that an acceleration sensor 171 is activated.

When the current terminal 100 is not in the horizontal mode state at step 607, the controller 160 may control the terminal 100 such that screen rotation based on the acceleration sensor 171 is supported in step 609. That is, the controller 160 may determine a rotating state of the terminal 100 based on information collected by the acceleration sensor 171 and accordingly support screen change.

When the current terminal 100 is in the horizontal mode state at step 607, the controller 160 may activate the gyro sensor 173 and control the terminal 100 such that sensing information is collected while initialization, namely, performing sensor reset in step 611. Here, the controller 160 may determine whether gravitational acceleration provided from the acceleration sensor 171 is 90°. In this case, the controller 160 may determine whether the gravitational acceleration of 90° is maintained for a predetermined time and determine that the terminal 100 is in the horizontal state.

After that, the controller 160 supports the screen change based on the collected sensing information of the gyro sensor 173 in step 613. That is, when the angular velocity information collected by the gyro sensor 173 is moved in an +z axis at a preset angle, the controller 160 may control the terminal 100 such that the landscape mode is changed to the transverse or portrait mode or the transverse or picture mode is changed to the landscape mode. Further, the controller 160 may control the terminal 100 such that a certain direction, for example one of the landscape mode or the transverse mode, is set. In the same manner, when the angular velocity information collected by the gyro sensor 173 is moved into a −z axis by a preset angle, the controller 160 may control the terminal 100 such that the landscape mode is changed to the transverse mode or the transverse mode is changed to the landscape mode, or one of the landscape mode or the transverse mode is set or maintained.

Next, the controller 160 determines whether an input signal for terminating a screen rotation control function is generated in step 615. When there is no separate input signal for terminating a function, the process returns to step 607 and repeats the foregoing procedures. Conversely, when the input signal for terminating a screen rotation control function is generated, the process returns to step 601 and repeats the foregoing procedures. In addition, between steps 611 and 613, the method for controlling rotation of the screen may increase reliability of determination of screen rotation through collection and application of geomagnetic sensor information in step 617. In more detail, when the geomagnetic sensor 173 is activated, the controller 160 activates the geomagnetic sensor 173 and controls the terminal 100 such that geomagnetic information is collected with collection of the angular velocity information. When rotation of the terminal 100 is determined, the controller 160 confirms geomagnetic information to again check whether the terminal 100 is rotated in a certain direction.

Moreover, the method for controlling rotation of the screen may further include a procedure of performing error correction in a procedure of collecting sensing information in step 619. That is, when the angular velocity information is collected, the controller 160 determines whether angular velocity greater than a preset value set to the x and y axes is generated from the angular velocity information. Further, when generated angular velocity information in the x and y axis directions is greater than a preset value, the controller 160 determines that a current state of the terminal 100 is not a horizontal mode. Although angular velocity information greater than a predetermined angle is collected by the terminal 100, the controller 160 may control the collection of the information such that application of corresponding information is canceled. When sensing information including angular velocity information greater than a predetermined size is collected in one of the x and y axis directions in the angular velocity information, the controller 160 may control the terminal 100 such that a current screen state is maintained without applying screen rotation control of a corresponding terminal 100.

As described above, the method for controlling rotation of a screen according to an exemplary embodiment may determine the rotation of the terminal 100 and the screen, when the terminal 100 is in a horizontal state. Accordingly, the user may receive mode change information displayed on a screen on various environments, and accordingly information writing and control of the terminal 100 may be easily performed. In the meantime, as described above, an output direction of the screen may be adaptively changed according to a change of a direction of the terminal 100. An output direction of a screen outputted on the display unit 140 may have two screen output directions, namely, a landscape mode and a transverse mode. For example, in a case of the transverse mode, the output direction of information on a screen of the display unit 140 may have a first direction in which information is outputted from a upper direction of the display unit 140 to a lower direction thereof and a second direction in which the information is outputted from the lower direction of the display unit 140 to the upper direction thereof. In a case of the transverse mode, in the same manner, information may be outputted in a first direction from the upper direction to the lower direction and in a second direction from the lower direction to the upper direction. The terminal 100 may selectively provide a function of supporting only a screen output in one direction and a function of supporting a screen output in two directions when the terminal is arranged on a flat surface or in a horizontal mode according to user setting or the intention of the user.

In more detail, in a case where supporting output in only one direction, the terminal 100 provides a screen for outputting information in a first direction from the upper side to the lower side or a screen for outputting information in a second direction from the lower side to the upper side when the terminal is arranged in a transverse mode in a flat surface or horizontal state. Further, the terminal 100 may control the direction of the screen such that the screen having the same direction as a direction of a screen outputted in the transverse mode is outputted in the landscape mode regardless of left rotation or right rotation in a procedure of changing the transverse mode to the landscape mode. When rotating the screen in a certain direction greater than a predetermined angle when the screen is placed on a flat surface or in a horizontal state, so as to change the landscape mode to the transverse mode, the screen of the terminal 100 may remain in the same direction as a screen direction outputted on a previous transverse mode regardless of a rotating direction of the terminal 100.

When supporting a screen output in two directions, the terminal 100 may differently support an output direction during rotation of the screen. For example, it is assumed that a screen of a first direction in a transverse mode when the terminal 100 is placed on a horizontal state is outputted on the display 140. If a left rotation for changing a mode from a transverse mode to a landscape mode occurs, the terminal 100 is put in a landscape direction based on a front surface of the user, and a screen outputted on the display unit 140 of a corresponding terminal 100 is put in a landscape mode so that a screen of a first direction from an upper direction to a lower direction may be outputted. In the meantime, when a right rotation for changing a mode from the transverse mode to the landscape mode occurs, the terminal 100 is put in a landscape direction based on a front surface of the user, so that a screen of a second direction from a lower direction to an upper direction is outputted on a display unit 140. Such an output function may be similarly applied in a procedure of changing the mode from the landscape mode to the transverse mode. That is, when the mode is changed from the landscape mode to the transverse mode, according to a rotation direction of the terminal 100, the display unit 140 of the terminal 100 may output one of a screen of a first direction from an upper side of the transverse mode to a lower side thereof or a screen of a second direction from the lower side to the upper side. In this case, when the terminal is rotated in a left direction, the terminal 100 may output a screen of a second direction on the display unit 140. Further, when the terminal is rotated in a right direction, the terminal 100 may output a screen of a first direction on the display unit 140. During rotation of terminal 100 in a left direction, the terminal 100 may control the display unit 14 such that a screen in the first direction is outputted. During rotation of the terminal 100 in a right direction, the terminal 100 may control the display unit 140 such that a screen of the second direction is outputted. Setting the foregoing screen rotation may be changed according to user setting, and may be determined in a design procedure according to intention of a designer.

Further, as described above, the terminal 100 is capable of switching the rotation of the screen according to a predetermined rotation direction. That is, when the terminal 100 is rotated in a left direction at a greater than a predetermined angle, the terminal 100 may switch to a transverse mode screen or a landscape mode screen. Further, when the terminal 100 is rotated in a right direction at a greater than a predetermined angle when the terminal 100 is placed flat on a surface, the terminal 100 may switch the orientation of the screen such that a transverse mode screen of the second direction to a landscape mode screen is outputted.

Figure 7:
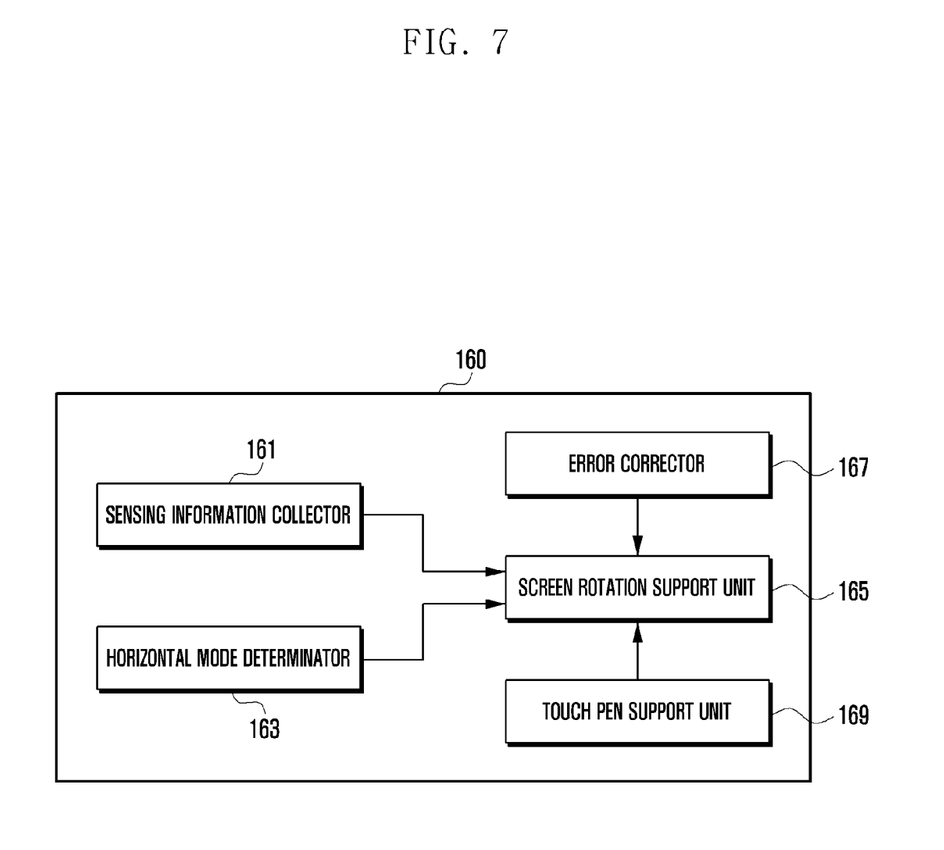
FIG. 7 is a block diagram illustrating a controller of a terminal according to an exemplary embodiment of the present invention.

FIG. 7 is a block diagram illustrating a controller of a terminal for supporting a screen rotation control function according to an exemplary embodiment of the present invention.

Referring to FIG. 7, a controller 160 of a terminal according to an exemplary embodiment may include a sensing information collector 161, a horizontal mode determinator 163, a screen rotation support unit 165, an error corrector 167, and a touch pen support unit 169.

Here, the sensing information collector 161, the horizontal mode determinator 163, the screen rotation support unit 165, and the error corrector 167 have the same functions and roles as those of the controller 160 described in FIG. 3, and the descriptions thereof are omitted.

Meanwhile, when a terminal 100 supports generation and application of a touch event through cooperation with the touch pen 200, the touch pen support unit 169 may be added. The touch pen support unit 169 may recognize contact of the touch pen 200 based on unique physical information, for example, capacitance information of the touch pen 200. When the touch pen 200 is contacted, the touch pen support unit 169 may support a certain user function. That is, when capacitance detected from the touch panel is equal to or greater than a preset value, the touch pen support unit 169 automatically determines an operation of the touch pen 200 and supports a function for operating the touch pen 200. The touch pen support unit 169 may provide a menu item for operating the touch pen 200.

When capacitance of a certain value is determined or a corresponding menu item is activated, the touch pen support unit 169 may apply a writing setting value or a preset value to a touch event according to an input of the touch pen 200 to support information outputted from the display unit 140 differently from a touch of a finger. When a horizontal mode of the terminal 100 is operated, the touch pen support unit 169 may control the terminal 100 such that a writing setting value is applied differently according to a landscape mode state or a transverse mode state, or a mode change state.

For example, when a current state of the terminal 100 is a landscape mode state, the touch pen support unit 169 applies a first writing setting value including at least one of a line of a first thickness, a first color, a first font, and a first dot line form. When the terminal 100 is in a transverse mode state, the touch pen support unit 169 applies a second writing setting value including at least one of a line of a second thickness, a second color, a second font, and a second dot line form. When a current state of the terminal 100 is a transverse mode state, the touch pen support unit 169 may apply a writing setting value of an eraser function. As described above, the touch pen support unit 169 of an exemplary embodiment may apply different writing setting values depending on whether the terminal 100 is on a landscape mode and a transverse mode, and when a mode is changed, the touch pen support unit 169 may control the orientation of the screen of the terminal 100 such that the writing setting value is changed to another value. Accordingly, when using the touch pen 200, the user may perform rapid and easy writing function operations. Accordingly, an exemplary embodiment includes a touch pen contacting a display unit of the terminal, an acceleration sensor for checking a horizontal state of the terminal, and a gyro sensor for collecting angular velocity information of the terminal.

Disclosed is a configuration of a touch system for supporting screen rotation control which includes a terminal applying a writing setting value of the touch pen differently according to a terminal rotation state when the terminal is placed flat on a surface or in a corresponding horizontal state or a terminal rotation change state when the terminal is placed flat on a surface or is arranged in a horizontal state.

Here, the terminal applies a writing setting value having at least one different value of a thickness, a color, a dotted line, and a font with respect to a touch event generated from the touch pen according a landscape mode or a transverse mode of the terminal when the terminal is placed flat on a surface or in the horizontal state.

As mentioned above, a method for controlling a rotation of a screen and a terminal supporting the same according to an exemplary embodiment may support rotation of the screen such that rotation control is possible in an environment or position where the terminal 100 is placed flat or an surface or is in a horizontal state, and support such that various functions of the touch pen 200 may be operated in a horizontal state. Accordingly, the user may perform a series of operations on the terminal 100 without being restricted from an orientation state of the screen of the terminal 100.

The foregoing terminal 100 may further include various additional modules according to provision forms. That is, when the terminal 100 is a communication terminal, the terminal 100 may include constructions that are not mentioned such as a near distance communication module for near distance communication, an interface exchanging data in a wired communication scheme or a wireless communication scheme of the mobile terminal 100, an Internet communication module communicating with an Internet to perform an Internet function, and a digital broadcasting module receiving and broadcasting digital broadcasting. The structural elements can be variously changed according to convergence trends of digital devices, and the skilled person will appreciate that many elements, other than those listed may be provided. The portable terminal 100 may include structural elements equivalent to the foregoing structural elements. Further, the terminal 100 according to an exemplary embodiment may be substituted by specific constructions in the foregoing arrangements according to the provided form or another structure. This can be easily understood to those skilled in the present art.

The terminal 100 according to an exemplary embodiment may include various information and communication devices, multi-media devices and application devices thereof such as a Portable Multimedia Player (PMP), a digital broadcasting player, a Personal Digital Assistant (PDA), a music player (e.g., MP3 player), a portable game terminal, a smart phone, a notebook computer, and a handheld PC as well as a mobile communication terminal operating based on respective communication protocols corresponding to various communication systems.

As described above, in the method for controlling a rotation of a screen and a terminal and a touch system supporting the same according to an exemplary embodiment, the terminal may exactly recognize a screen direction of the terminal requested from the user regardless of a state of a terminal, and accordingly support suitable screen direction rotation control.

Accordingly, the method, the terminal, and the system of the exemplary embodiments may arrange a terminal and a screen orientation regardless of a current orientation state of the screen of the terminal and an environment in which the terminal is placed to conveniently and easily perform a desired operation.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement embodiments of the present invention. Accordingly, embodiments provide a program comprising code for implementing a method, apparatus, terminal and/or system as claimed in any one of the claims of this specification, and a machine-readable storage storing such a program. Still further, such programs may be conveyed electronically via any medium such as a communication signal carried over a wired or wireless connection and embodiments suitably encompass the same.

While the present invention has been shown and described with reference to certain exemplary embodiments thereof, it will be by those skilled in the that various changes in form and details may be made therein without departing from the scope of the invention as defined by the appended claims.

What is claimed is:

1. A method for controlling a rotation of a screen of a terminal, the method comprising:
   determining, using an acceleration sensor, whether the terminal is arranged in a flat state, the terminal in the flat state being parallel with respect to a surface of an object on which the terminal is arranged;
   when it is determined that the terminal is arranged in the flat state, checking a rotated state or a rotation change state of the terminal using a gyro sensor;
   collecting geomagnetic information of the terminal;
   verifying the rotated state or the rotation change state of the terminal in the flat state using the geomagnetic information;
   if the verification of the rotated state or the rotation change state of the terminal is successful, changing a screen output orientation of a display unit of the terminal according to the rotated state or the rotation change state of the terminal in the flat state; and
   when it is determined that the terminal is not arranged in the flat state, determining the rotated state or the rotation change state of the terminal using the acceleration sensor,
   wherein the checking of the rotated state or the rotation change state of the terminal using the gyro sensor comprises:
      collecting angular velocity information according to rotation of the terminal based on x, y, and z axes with respect to the flat state; and
      determining a counterclockwise rotation or a clockwise rotation of the terminal according to analysis of the angular velocity information.

2. The method of claim 1, wherein the determining whether the terminal is arranged in a flat state comprises:
   collecting acceleration information according to movement of the terminal;
   determining whether the acceleration information indicates a range of 90° of a gravitational acceleration; and
   determining whether the terminal is in the flat state according to the determination result.

3. The method of claim 1, further comprising:
   initializing the angular velocity information after determining the rotation of the terminal; and
   determining rotation of the screen to a corresponding direction when the accumulated angular velocity information is equal to or greater than the predetermined angle.

4. The method of claim 1, further comprising changing from the flat state or prohibiting from entering into the flat state when angular velocity information greater than a preset value is detected from at least one of the x and y axes in the collected angular velocity information.

5. The method of claim 1, wherein the changing of the screen output form of the display unit comprises at least one of:
   changing the screen orientation to a landscape mode or a transverse mode according to a rotating direction of the terminal; and
   maintaining the landscape mode or the transverse mode of the screen outputted on the display unit according to the rotating direction of the terminal.

6. The method of claim 5, wherein the maintaining of the landscape mode or the transverse mode of the screen comprises one of:
   outputting information such that a transverse mode of a first direction in which information is outputted from an upper side to a lower side or a transverse mode of a second direction in which the information is outputted from the lower side to the upper side is outputted on the display unit when the terminal is rotated in a counter-clockwise direction at an angle greater than a predetermined angle; and
   outputting the information such that a transverse mode of the first or second direction is outputted on the display unit when the terminal is rotated in a clockwise direction at an angle greater than the predetermined angle.

7. The method of claim 5, wherein the changing of the landscape mode or transverse mode of the screen comprises:
   checking the screen orientation before entering the flat state or a currently displayed state of the terminal; and
   supporting such that a screen of an output direction other than the screen state right before entering the flat state or the currently displayed screen is outputted on the display unit when the terminal is rotated at an angle greater than a predetermined angle.

8. The method of claim 1, further comprising:
   contacting the display unit with a touch pen;
   differently defining a writing setting value of the touch pen according to a terminal screen output direction of the flat state; and
   applying a writing setting value according to the defining to a touch event generated according to the contact of the touch pen.

9. A terminal for supporting screen rotation control, the terminal comprising:
   a sensor unit including an acceleration sensor configured to confirm a flat state of the terminal, a gyro sensor configured to collect angular velocity information of the terminal, and a geomagnetic sensor configured to collect geomagnetic information of the terminal;
   at least one processor configured to:
      determine if the terminal is in the flat state based on sensing information of the acceleration sensor, the terminal in the flat state being parallel with respect to a surface of an object on which the terminal is arranged, when it is determined that the terminal is arranged in the flat state, confirm a rotated state or a rotation change state of the terminal in the flat state based on sensing information of the gyro sensor, verify the rotated state or the rotation change state of the terminal in the flat state using the geomagnetic information, and when it is determined that the terminal is not arranged in the flat state, determine the rotated state or the rotation change state of the terminal using the acceleration sensor; and a display unit configured to output a screen having a different output direction according to the rotated state or the rotation change state of the terminal, if the verification of the rotated state or the rotation change state of the terminal is successful.

10. The terminal of claim 9, wherein the at least one processor accumulates the collected angular velocity information based on x, y, and z axes, and determines a rotation of the terminal in a corresponding direction when the accumulated angular velocity information is equal to or greater than a predetermined angle in one direction, and initializes the angular velocity information after determining the rotation of the terminal, determines rotation of the terminal in the corresponding direction when the accumulated angular velocity information obtained from the collected angular velocity information after the initialization is equal to or greater than the predetermined angle.

11. The terminal of claim 10, wherein the at least one processor changes the flat state of the terminal or prohibits the terminal from entering into the flat state when angular velocity information greater than a preset value is detected from at least one of the x and y axes in the collected angular velocity information.

12. The terminal of claim 9, wherein the display unit changes an orientation of the screen from a landscape mode to a transverse mode or from the transverse mode to the landscape mode according to a rotating direction of the terminal, or maintains a landscape mode or a transverse mode according to the rotating direction of the terminal.

13. The terminal of claim 12, wherein the display unit supports such that a landscape mode of a first direction in which information is outputted from an upper side to a lower side or a landscape mode of a second direction in which the information is outputted from the lower side to the upper side is outputted on the display unit when the terminal is rotated in a counterclockwise direction at an angle greater than a predetermined angle; and supports such that a transverse mode of the first or second direction is outputted on the display unit when the terminal is rotated in a clockwise direction at an angle greater than the predetermined angle.

14. The terminal of claim 12, wherein the at least one processor checks a screen state right before entering the flat state or a currently displayed screen of the terminal; and supports such that a screen of an output direction other than the screen state right before entering the flat state or the currently displayed screen is outputted on the display unit when the terminal is rotated at an angle greater than the predetermined angle.

15. A touch system supporting screen rotation control, the system comprising:

a touch pen; and a terminal including:

an acceleration sensor configured to confirm a flat state of the terminal, the terminal in the flat state being parallel with respect to a surface of an object on which the terminal is arranged, a gyro sensor configured to collect angular velocity information of the terminal, to determine a rotated state or a rotation change state of the terminal, and to apply different writing setting values according to the rotated state or the rotation change state of the terminal in a corresponding flat state when the terminal is arranged in the flat state, and a geomagnetic sensor configured to collect geomagnetic information of the terminal for verifying the rotated state or the rotation change state of the terminal in the flat state, wherein, when the terminal is not arranged in the flat state, the acceleration sensor is further configured to determine the rotated state or the rotation change state of the terminal.

16. The touch system of claim 15, wherein the terminal applies a first writing setting value having at least different one of a thickness and a color of a line, a dotted line, or a font with respect to a touch event generated by the touch pen according to a landscape mode or a transverse mode of the terminal in the flat state, or applies a second writing setting value different from the first writing setting value in one of the landscapes mode or the transverse mode of the terminal in the flat state and applies an eraser setting value in another mode.

* * * * *